(No Model.)
A. WARREN.
BICYCLE.
No. 571,029. Patented Nov. 10, 1896.
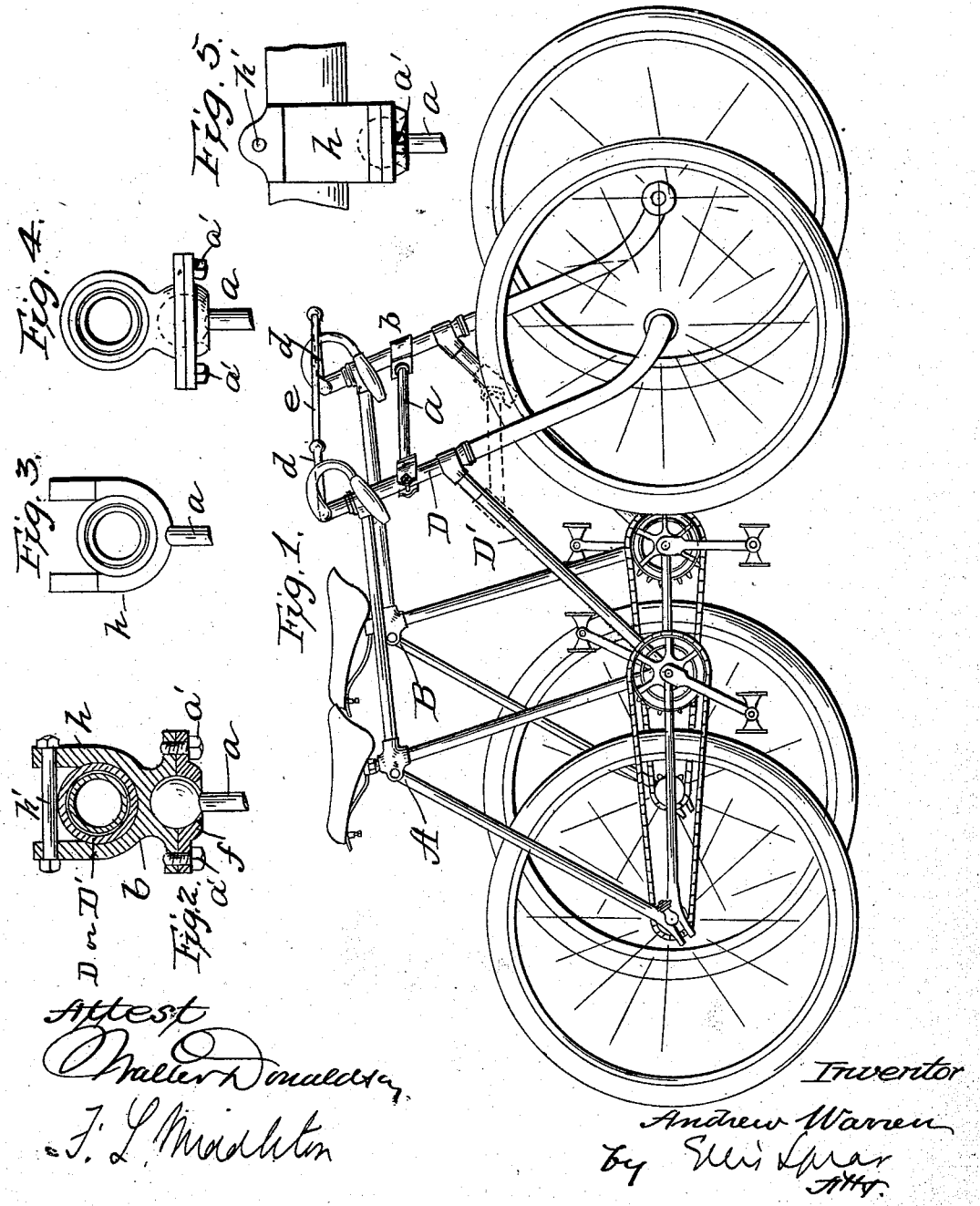

UNITED STATES PATENT OFFICE.

ANDREW WARREN, OF ST. LOUIS, MISSOURI.

BICYCLE.

SPECIFICATION forming part of Letters Patent No. 571,029, dated November 10, 1896.

Application filed July 27, 1895. Serial No. 557,367. (No model.)

*To all whom it may concern:*

Be it known that I, ANDREW WARREN, a subject of Her Britanic Majesty, the Queen of Great Britain, residing at St. Louis, in the State of Missouri, have invented certain new and useful Improvements in Bicycles, of which the following is a specification, reference being had therein to the accompanying drawings.

My invention relates to the coupling together of bicycles in such manner as to cause them to act when ridden in part as one machine.

My object is to cause two bicycles to support each other without interfering with their necessary independent action and at the same time permit them to adapt themselves to rough roads without danger to the riders. By mutual support of the connection which I have provided the machines may be ridden without danger of overturning, same being as safe as any ordinary four-wheeled vehicle of same elevation and parallel distance apart of wheels, thus doing away with the numerous and constantly-occurring accidents to bicycles when ridden separately. I have also secured uniformity of direction in the machines, so that in the matter of steering both wheels will necessarily and invariably take the same direction.

My invention is illustrated in the accompanying drawings, in which—

Figure 1 is a view of two bicycles connected together. Figs. 2, 3, 4, and 5 show the details of coupling.

In the drawings I have shown two bicycles A and B of ordinary construction. The frames are connected by bar $a$, which has a ball-and-socket connection at each end in a clamp $b$, these ball-and-socket connections forming a universal joint at each end of the connecting-bar, whereby freedom of movement is obtained for each machine, while at the same time the machines mutually support each other. In order, however, that the machines may act harmoniously, I provide another connection similar to the first, but made between the handle-bars or the steering mechanism of the machines, whereby the motion of one steering mechanism guides or controls the movement of the other, and the steering of the machine is either the result of the joint movement imparted by two riders or the movement of one alone.

The connection between the steering mechanism is preferably made like the other connection with universal joint. This connection consists of a bar $e$, which is connected by ball-and-socket joints to rigid arm $d$, set centrally upon the handle-bars, respectively, and projecting forward. This is the preferable form, but is not an essential one. The arms $d$ are set rigidly, and the connection $e$ is made of a suitable length, as $a$. This compels the same movement in both handle-bars and thus certainly guides the machines together. In the detailed figures I have shown different forms of clamps.

In the clamp shown in Figs. 2 and 5 the part $h$ embraces the standard, being held in position by a pin $h'$. This part has a hemispherical socket to receive the ball carried on the end of the bar $a$, this bar also carrying the part $f'$, which is adapted to be secured to the part $h$ by suitable screws $a'$.

In Fig. 4 I have illustrated a clamp that is attached permanently to the frame, the rod $a$ being removably attached thereto, as in the before-described form.

The clamp illustrated in Fig. 3 is rigidly attached to the bar $a$ or formed integral therewith, and this clamp is held in position on the frame by a bolt, as in the clamps shown in Figs. 2 and 5.

While I have shown connection between the universal joints, I do not limit myself in this respect to the bar $a$ to universal joints, as these may be rigid or loose connection, but not with the same beneficial effect, because the bar $e$ must be flexibly connected with the arm $d$.

What I claim is—

The combination with two bicycles, of the arms extending forward centrally of each handle-bar, the sockets carried on the outer ends of said bars and the connecting-bar having the heads on each end thereof fitted to said sockets and a bar $a$ extending between the heads D of the bicycles and having ball-and-socket connection therewith, substantially as described.

In testimony whereof I affix my signature in presence of two witnesses.

ANDREW WARREN.

Witnesses:
 ARTH. GREENE,
 C. K. GREENE.